United States Patent [19]

Ruiz et al.

[11] 4,011,296
[45] Mar. 8, 1977

[54] IRRADIATED FUEL REPROCESSING

[75] Inventors: Carl Phillip Ruiz, Fremont; John Paul Peterson, Jr., Livermore, both of Calif.

[73] Assignee: General Electric Company, San Jose, Calif.

[22] Filed: May 27, 1975

[21] Appl. No.: 581,138

[52] U.S. Cl. .................................. 423/4; 423/7; 423/8; 423/10

[51] Int. Cl.² .................................. C01G 43/00

[58] Field of Search .................. 423/4, 7, 8, 10

[56] References Cited

UNITED STATES PATENTS

| | | | |
|---|---|---|---|
| 3,208,819 | 9/1965 | Wallace | 423/7 |
| 3,374,068 | 3/1968 | Erlandson et al. | 423/10 X |
| 3,432,276 | 3/1969 | Reas | 423/7 |
| 3,574,531 | 4/1971 | Schulz | 423/10 |
| 3,825,649 | 7/1974 | Gresky et al. | 423/4 |
| 3,867,510 | 2/1975 | Miller et al. | 423/4 |

Primary Examiner—Edward A. Miller
Attorney, Agent, or Firm—Ivor J. James, Jr.; Samuel E. Turner; Sam E. Laub

[57] ABSTRACT

A process for separately recovering uranium, plutonium and neptunium substantially free of fission products from irradiated nuclear fuel is presented in which the fuel is dissolved in a strong mineral acid forming an aqueous dissolved nuclear fuel solution and treated to separate the uranium, plutonium and neptunium therefrom substantially free of said fission products by the sequential steps of solvent extraction, ion exchange and fluorination. The process has an improvement comprising the addition of a sufficient quantity of an additive of a stable metallic complex to the aqueous dissolved nuclear fuel solution prior to solvent extraction. This achieves improved purity of the separated uranium, plutonium and neptunium.

24 Claims, 3 Drawing Figures

IRRADIATED FUEL REPROCESSING

BACKGROUND OF THE INVENTION

Nuclear chain fission reactions and the reactors in which such reactions are accomplished are now well known. In general, a nuclear reactor is made up of a chain reacting assembly including nuclear fuel material contained in fuel elements having various geometric shapes such as plates, tubes, or rods. These fuel elements are usually provided with a corrosion-resistant non-reactive heat conductive layer or clad on their external surfaces. In power reactors, these elements are usually grouped together at fixed distances from one another in a coolant flow channel or region forming what is termed a fuel bundle. A sufficiently large number of such bundles are combined together in the chain reacting assembly or core to permit a controllable self-sustained nuclear fission chain reaction. The reactor core is enclosed within a container through which the reactor coolant is circulated. In thermal neutron spectrum reactors, a neutron moderator is also provided, and in some cases this moderator may also perform as the reactor coolant. The known boiling water and pressurized water reactors are examples of such thermal reactors.

The nuclear fuel material may contain fissionable atoms such as U-233, U-235, Pu-239, or Pu-241, and this material may be in elemental or compound form. Upon absorption of a neutron by the nucleus of such a fissionable atom, a nuclear disintegration frequently results. This produces on the average two fission product atoms of lower atomic weight and of great kinetic energy. Also released in such a disintegration are several neutrons of high energy. For example, in the fission of U-235 atoms, light fission product atoms of mass number ranging between 80 and 110 and heavy fission product atoms of mass number ranging between 125 and 155 are produced. On the average, 2.5 neutrons per fission event are released. The total energy released approaches 200 mev. (million electron volts) per fission.

The kinetic energy of the fission product atoms as well as that of the fission neutrons is quickly dissipated producing heat in the fuel elements of the reactor. Some additional heat is generated directly in the reactor structural materials, in the coolant, and any moderator present, due to radiation effects. If there is one net neutron remaining on the average from each fission event and this neutron induces a subsequent fission event, the fission reaction becomes self-sustaining and is thus called a chain reaction. Heat generation may be maintained and the heat is removed by passing a coolant fluid through heat exchange relationship with the fuel elements. The fissionable atoms are thus gradually consumed. Some of the fission product atoms produced are strong neutron absorbers (fission product poisons). Thus the fission reaction tends to decrease and cannot be maintained indefinitely at a given level.

In some nuclear reactor fuel elements, fertile atoms such as U-238 may be included in addition to the above noted fissionable atoms. A fairly common currently used nuclear power reactor fuel material consists of enriched uranium dioxide ($UO_2$) in which approximately 2.0% of the uranium atoms are U-235 which are readily fissionable by thermal neutrons, while the approximate remainder of 98% is U-238 which is not so fissionable to any significant degree. In the course of operating a reactor fueled with such fissionable and fertile atoms, the fissionable atoms (U-235) originally present are gradually consumed and simultaneously neutron irradiation of the fertile atoms (U-238) converts a part of them into additional fissionable atoms (Pu-239). Initially, the concentration of these newly created fissionable atoms gradually rises with irradiation and then approaches an equilibrium value. These atoms are also readily fissionable by thermal neutrons and thus contribute to the maintenance of the chain fission reaction so that the reaction may be continued longer than would have been the case if only the original charge of fissionable atoms were available.

Since the rate at which fissionable atoms are created by fertile atom conversion is (except in the breeder-converter type of reactor of special design) always less than the rate at which the original fissionable atom charge is consumed during operation, the reactor can maintain this heat generation at a given power level for only a finite length of time. Thereafter, the maximum power level at which the reactor can be operated must be decreased and finally the reactor must shut down for refueling. Some or all of the irradiated fuel bundles are removed and replaced with new fuel bundles having a higher concentration of fissionable atoms and no fission product poisons. The reactivity of the refueled reactor core is higher and the original power level can thus be restored.

The irradiated reactor fuel removed from the reactor ordinarily contains a valuable unconsumed quantity of the original fissionable material as well as a significant quantity of fissionable material (the fissionable atoms) converted from any fertile material (the fertile atoms) which may have been a component of the original fuel. Irradiated fuel also may contain fission products (the fission product atoms) or transuranic isotopes (or both) which are of substantial value. In addition to plutonium referred to above, one such transuranic is the neptunium isotope Np-237, which is formed from neutron irradiation of U-235 and U-238 in accordance with the following reactions:

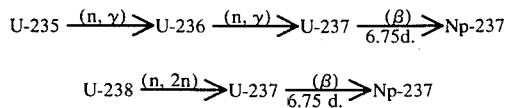

While Np-237 may have other uses, one current use is in the production of Pu-238 by further neutron irradiation in accordance with the following reactions:

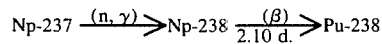

Pu-238 is a long lived (89 year half-life) energetic alpha particle emitter, the radioactive decay of which yields thermal energies at rates sufficient to power direct thermal to electrical energy conversion devices.

Accordingly it is highly desirable to reprocess the irradiated fuel to recover and separate the fissionable and fertile materials for reuse, and to recover transuranic isotopes such as plutonium for use in reactor fuels and $Np^{237}$ for use in production of $Pu^{238}$, or for other uses.

One particularly advantageous irradiated fuel recovery process is described and claimed in U.S. Pat. No.

3,374,068 issued Mar. 19, 1968 in the names of O. D. Erlandson and B. F. Judson. This patent presents an improved chemical process capable of separating transuranic irradiation products from one another and from uranium and fission products. In this process the irradiated fuel is dissolved in acid to form an acid solution. The uranium, plutonium and neptunium are separated without partition from the fission products in the irradiated nuclear fuel solution by extraction with an organic solvent thus forming a product stream and a fission products stream. The fission products stream is dehydrated and calcined and these materials are recovered as an oxide mixture. The uranium and transuranium products in the product stream are recovered from the product stream as a mixture with substantially reduced amounts of fission products. The transuranics are separated from the uranium, and from each other if desired, by contact with and elution from anion exchange resins. The uranium stream is dehydrated and calcined to produce uranium oxide containing trace fission oxides and the substantially plutonium free oxide mixture is fluorinated so that uranium hexafluoride is recovered as a product substantially free of fission product fluoride.

The present invention is directed to an improvement of the process of U.S. Pat. No. 3,374,068 in which the decontamination factor of niobium is enhanced to provide improved purity of the recovered actinide products.

OBJECTS OF THE INVENTION

It is therefore a primary object of the present invention to provide an improved simplified chemical reprocessing procedure for the recovery of neptunium, plutonium and uranium from irradiated nuclear fuel at high niobium decontamination factors (i.e., very high purity of the neptunium, plutonium and uranium with minimal niobium impurities therein) in a minimum number of processing steps.

Another object of this invention is to provide a metallic complex in an acidic solution for addition to an aqueous dissolved nuclear fuel solution during reprocessing so that the addition does not result in the polymerization of plutonium which can occur with the addition of a neutral or basic solution.

A further object of this invention is to provide an additive in the form of a metallic peroxide complex which can be added to an aqueous dissolved nuclear fuel solution without decreasing the extractability of the uranium, plutonium or neptunium in the solvent extraction step.

A particularly preferred object of this invention is to provide an additive in the form of a niobium peroxide complex which decreases the fission product niobium extractability from an aqueous dissolved nuclear fuel solution into an organic solvent in a solvent extraction step.

Still another object of this invention is to provide an additive in the form of a metallic complex for use in recovery of uranium, plutonium and neptunium from an aqueous dissolved nuclear fuel solution which metallic complex is subsequently destroyed or dispersed after addition to the solution and prior to the solvent extraction step.

The foregoing objects and advantages along with other objects and advantages of this invention will become apparent to those skilled in the art from the following summary, description and illustration of the invention.

SUMMARY OF THE INVENTION

The present invention achieves increased removal of niobium from the uranium, plutonium and neptunium products recovered from irradiated nuclear fuel in an organic-aqueous solvent extraction process. This is achieved by adding an additive of a stable (non-radioactive) metallic complex to an aqueous dissolved nuclear fuel solution formed by dissolving the irradiated nuclear fuel in a strong mineral acid, and this addition of the additive is prior to contacting the solution with an orgainc solvent for an organic solvent extraction step. The additive is dispersed in the aqueous dissolved nuclear fuel solution and gives an alteration of the niobium decontamination factor between the aqueous solution and an organic solvent used during extraction of the uranium, plutonium and neptunium from the aqueous dissolved nuclear fuel solution. The additive of an non-radioactive metallic complex is subsequently destroyed after addition to the aqueous solution and prior to the organic solvent extraction step. A particularly preferred additive is stable niobium in the form of a peroxide complex in an acidic solution.

The practice of this invention has the striking advantage that the decontamination factor of niobium is no longer the limiting factor in the reprocessing of irradiated fuel because the additive used in the process of this invention increases the extent of removal of niobium from the recovered products of uranium, plutonium and neptunium.

The present invention will be more readily understood by reference to the following detailed description which includes references to accompanying drawings in which.

DESCRIPTION OF THE INVENTION

Figure 1:
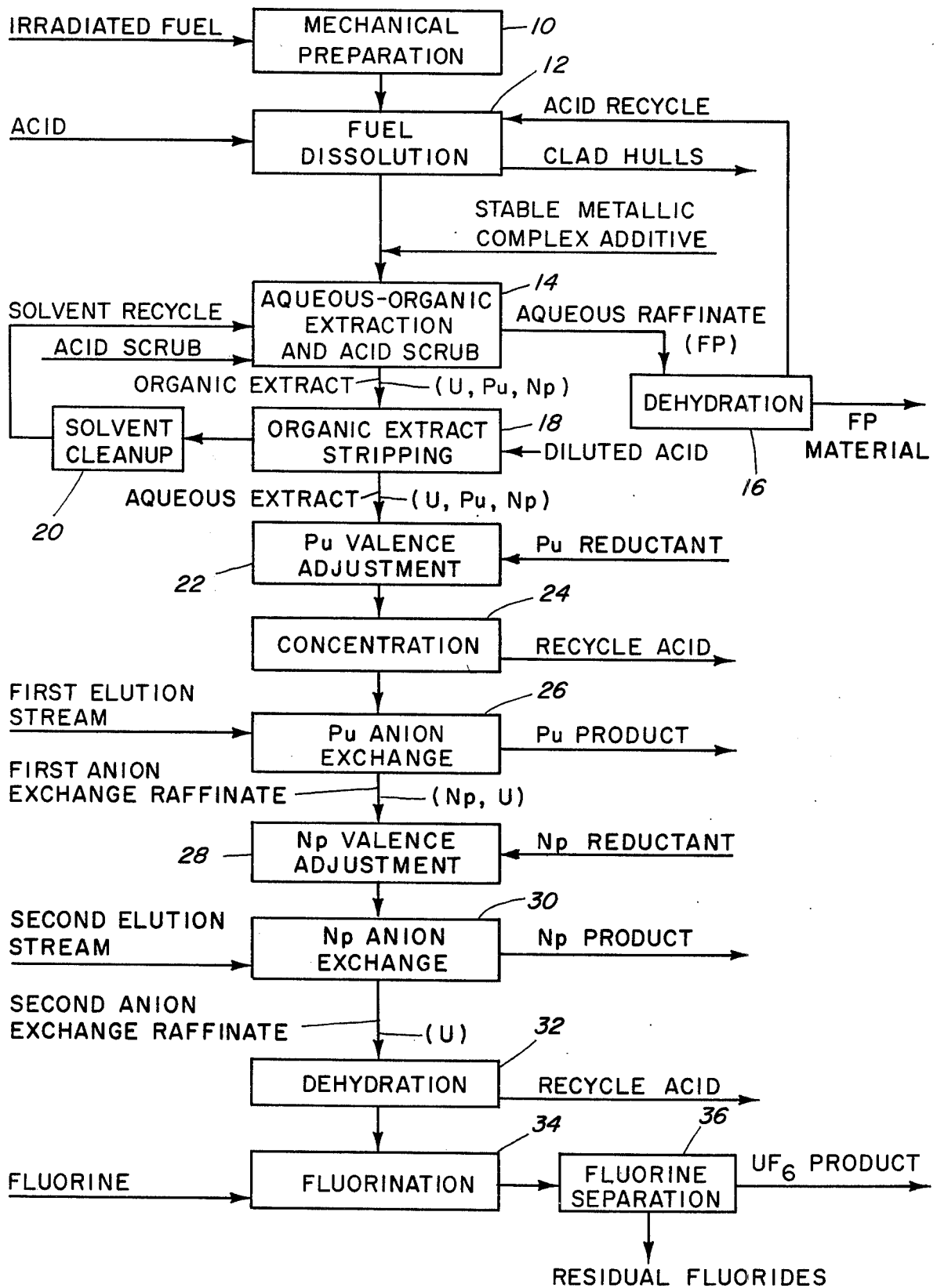
FIG. 1 is a simplified block diagram illustrating the steps of the process of the present invention.

Referring now more particularly to FIG. 1, irradiated nuclear reactor fuel is introduced to mechanical preparation zone 10. Here the flow channels, lifting bales, nose pieces, and other non-fuel containing parts of the fuel bundle are removed so that only the fuel containing parts can be disassembled. If desired, mechanical disassembly of the fuel bundle, such as by separating individual fuel rods, may also be utilized here. In one embodiment, the individual fuel rods so collected are segmented such as by preferably chopping the rods into short sections about three inches long. In another embodiment of the invention, the full length fuel rods are passed through a rolling and punching mechanism which perforates the clad and crushes to a slight extent the fuel material contained within the fuel element. Each of these latter two operations is designed to increase the access of the dissolving acid to the fuel material contained in the cladding.

The mechanically prepared fuel is introduced into a fuel dissolution zone 12. In this step the irradiated fuel is contacted with a strong mineral acid (such as nitric acid) to dissolve the fuel material, leaving the clad metal (e.g. zirconium or stainless steel) substantially unaffected. This treatment produces an aqueous dissolved nuclear fuel solution (acid dissolver solution) of uranium, the transuranic irradiation products of plutonium, americuim, curium and neptunium, and the fission products, which may be separated from undissolved clad hulls by decantation, filtration, or similar operations.

The aqueous dissolved nuclear fuel solution is contacted with an additive of a stable (non-radioactive) metallic complex at any time after substantial dissolution of the irradiated fuel in the mineral acid and prior to the organic solvent extraction in zone 14. Preferably the complex is introduced in the form of a solution and agitation or mixing is performed after addition of the complex. The preferred metal is stable niobium and the preferred complex is a peroxide although other metals such as tantalum and other complexes such as oxalate, tartrate, or other organic complexes may be used. A sufficient amount of the complexing additive is added to the aqueous dissolved nuclear fuel solution to acheive alteration of the decontamination factor of the radioactive niobium in this solution thus enabling the attainment of higher product purity for the plutonium, uranium, and neptunium subsequently extracted from this solution. In greater detail, an addition of about $10^{-6}$ to about $10^{-3}$ moles/liter of metallic complex is sufficient to achieve the alteration of the niobium decontamination factor for the typical aqueous dissolved nuclear fuel solution. During addition of the metallic complex, the temperature of the fuel solution is not critical and is preferably in the range of about 50° to about 100° C. A particularly preferred additive in the practice of this step is a stable niobium peroxide complex in an acid solution such as nitric acid. For the metallic complexes other than tantalum peroxide and niobium peroxide, it may be desirable to add an oxidant to accelerate the decomposition of the metallic complex.

In this case, the oxidant may be mixed with the metallic complex in addition to the acid dissolver solution or may be added to the acid dissolver solution directly. A typical oxidant would be dilute solutions of potassium bromate or potassium permanganate.

The aqueous dissolved nuclear fuel solution so heated is introduced into the aqueous organic solvent extraction and acid scrub zone 14 where the solution is countercurrently contacted with an organic solvent. There are a number of known organic solvents suitable for making an extraction of uranium, plutonium and neptunium from the aqueous dissolved nuclear fuel solution into the organic solvent, including the paraffinic hydrocarbon solutions of tributyl phosphate, the dialkyl ethers, dibutyl Carbitol, and others. The uranium and transuranic (plutonium and neptunium) concentrate thus achieved in the organic solvent extraction extract phase (organic extract) gives a separation from the fission products which are substantially all retained in the aqueous solvent extraction raffinate phase (aqueous raffinate in FIG. 1).

The aqueous solvent extraction raffinate from zone 14 may be subjected to further processing. For example, it may be introduced into dehydration zone 16. Here the fission products are recovered in solid form for further processing or for disposal. In processes where the nuclear fuel has been dissolved in a volatile acid such as nitric acid, the aqueous raffinate may be heated to evaporate water and to recover a substantial part of the acid for reuse. The fission product solids remaining may be calcined to produce a substantially anhydrous fission product material in oxide form.

The organic extract from zone 14 is introduced into organic extract stripping zone 18 where the extract is countercurrently contacted with a dilute (approximately 0.01 molar) solution of a mineral acid such as nitric acid. The dilute nitric acid strips out the neptunium, plutonium, and uranium forming an aqueous solvent extraction product (aqueous extract in FIG. 1) containing these materials and leaving the organic solvent for treatment in solvent clean-up zone 20 and recirculation to zone 14.

The aqueous solvent extraction product is introduced into plutonium valence adjustment zone 22 and also there is introduced a thermally destructable plutonium reductant such as amino guanidine, ferrous ion, semicarbazide, ascorbic acid, or a hydroxylamine salt. Preferably this reductant is hydroxylamine nitrate, which is a thermally decomposable, fast acting agent which produces no residual solid material. The preferred reductant is introduced in sufficient quantity to make the solution approximately 0.02 molar in hydroxylamine nitrate. This reduces the higher valence state plutonium to a valence of Pu+3 and the valence of neptunium to $Np^{+4}$.

The thus reduced aqueous solvent extraction product from zone 22 is introduced into concentration zone 24. In this step this product is rapidly added to a boiling solution of strong nitric acid, and is concentrated by evaporation by a factor of about two. This renders ineffective the reductant introduced in zone 22 and oxidizes and stabilizes the plutonium as an anionic hexanitrato complex containing $Pu^{+4}$. Simutaneously the neptunium present is oxidized substantially entirely to valences greater than $Np^{+4}$, possibly a mixture of $Np^{+5}$ and $Np^{+6}$.

The concentrated stabilized solvent extraction product thus produced in zone 24 is cooled to approximately 60° C and is introduced into plutonium anion exchange zone 26. Here the solution is contacted with a bed of an anion exchange resin of the strong base quaternary amine type, such as those available commercially under the trade names Permutit SK, Dowex-1, and the like. The plutonium $Pu^{+4}$ is preferentially extracted by the resin, and the neptunium and uranium are substantially unaffected under these conditions and pass through forming a first aqueous anion exchange raffinate (first anion exchange raffinate in FIG. 1). Subsequently, the resin is scrubbed with strong nitric acid to remove uranium and fission product materials, and the resin bed containing the plutonium is then treated with dilute nitric acid as a first elution stream to produce a plutonium [$Pu^{+4}$] product stream substantially free of uranium, neptunium, and fission products.

The first anion exchange raffinate containing neptunium of greater than +4 valence and uranium, is then treated in neptunium valence adjustment zone 28 with a second thermally destructible neptunium reductant, such as a mixture of ferrous ion and hydrazine, and in sufficient amount to reduce the neptunium to $Np^{+4}$. Simultaneously, trace amounts of plutonium not extracted in zone 28 and which may be present in the first raffinate are reduced to $Pu^{+3}$. The reduced first raffinate is subsequently maintained at a temperature of about 60° C to render the second reductant ineffective and stabilize the neptunium as $Np^{+4}$ and to reoxidize and stabilize traces of plutonium as $Pu^{+4}$. Another neptunium reductant suitable for use in zone 28 would be semicarbazide..

In this condition and maintained at approximately 60° C, the stabilized, reduced first anion exchange raffinate is introduced into neptunium anion exchange zone 30 where it is contacted with a second bed of anion exchange resin of the same type referred to above in describing the plutonium anion exchange zone 26. In zone 30, the neptunium as $Np+4$ is preferentially extracted by the resin while the uranium passes through substantially unaffected and is dishcharged as a second anion exchange raffinate. The thus treated resin is subsequently scrubbed with strong nitric acid containing ferrous ion and hydrazine to remove uranium, plutonium, and fission product materials. Following this the scrubbed resin is treated with a second elution stream comprising dilute nitric acid thereby displacing the $Np+4$ as a product solution substantially free of plutonium, uranium, and fission products.

The second anion exchange raffinate is then introduced into dehydration zone 32 where it is heated to remove water and residual acid and to produce an anhydrous solid material containing the uranium as uranium trioxide ($UO_3$). The recovered acids are recirculated for reuse in the process. The substantially plutonium-free and neptunium-free anhydrous solids are discharged from zone 32 and are introduced into fluorination zone 34. Here the $UO_3$ is directly fluorinated with elemental fluorine to convert the $UO_3$ to uranium hexafluoride.

The fluorinated material is then introduced into fluoride separation zone 36 in which the uranium hexafluoride is separated from other fluorides which may be present, including traces of fission product fluorides.

The utilization in this invention of the improvement of adding the stable metallic complex to the aqueous dissolved nuclear fuel solution in a sufficient amount has the striking advantage that the decontamination factor of niobium is no longer the limiting factor in the reprocessing of irradiated nuclear fuel because the additive used in the process of this invention increases the extent of removal of niobium from the recovered products of uranium, plutonium and neptunium. The metallic complex is also very useful in that after some residence in an acidic solution the complex is destroyed leaving the niobium in a condition capable of forming non-monomeric species which significantly alters, in the sense of limiting, the extractability of niobium from the aqueous dissolved nuclear fuel solution.

Those skilled in the art will gain a further understanding of this invention from the following illustrative, but not limiting, examples of the invention.

EXAMPLES 1 AND 2

Two examples were performed to determine whether the addition of stable niobium altered the extractability of niobium-95 (radioactive niobium). A fission product spike solution was used in these examples, and this solution was prepared by dissolving approximately 200 milligrams of $UO_2$ in 10 milliliters of a solution of 3 molar in nitric acid and 1.5 molar in uranium. The $UO_2$ had been irradiated to an exposure of about 14,000 megawatt days/ton and had a six-month cooling time. For each example, a measured volume of this solution of 0.5 milliliters was made into (spiked into) 4.5 milliliters of a solution of 3 molar nitric acid having a 1.5 molar non-irradiated uranium to form a simulated dissolver solution. Glass separatory funnels were utilized in these examples to perform the contactings of the organic-aqueous phases and the subsequent phase separations. The separated phases were drained into glass bottles before sampling. The niobium-95 concentrations were measured by using a high resolution germanium lithium-drifted detector and components usually associated with gamma ray spectroscopy.

A 0.1 M niobium solution (diluent solution) was prepared by the dissolution of potassium hexaniobate in water. This solution was adjusted to a concentration of 0.2 M oxalic acid and acidified to 0.5 M $HNO_3$. In Example 1, measured volumes of this niobium solution were added to two containers of the simulated dissolver solution such that the niobium concentration for the two containers was $10^{-5}$ M and $10^{-3}$ M, respectively. The niobium concentration in another container of the solution (to which no niobium solution was added) was $10^{-8}$ M. These solutions were heated to reflux temperature about 15 minutes to promote isotopic exchange. To the boiling solutions which contained diluent niobium, an oxidant of potassium bromate was added such that its concentration was ten times higher than that of the oxalic acid to ensure the complete destruction of the oxalic acid. The solutions were cooled to 50° C and contacted with 30% tributyl phosphate previously scrubbed with a sodium carbonate solution and with water. The volume of tributyl phosphate was adjusted so that the uranium saturation was reasonably high and was subsequently measured to be 73% of theoretical.

Figure 2:
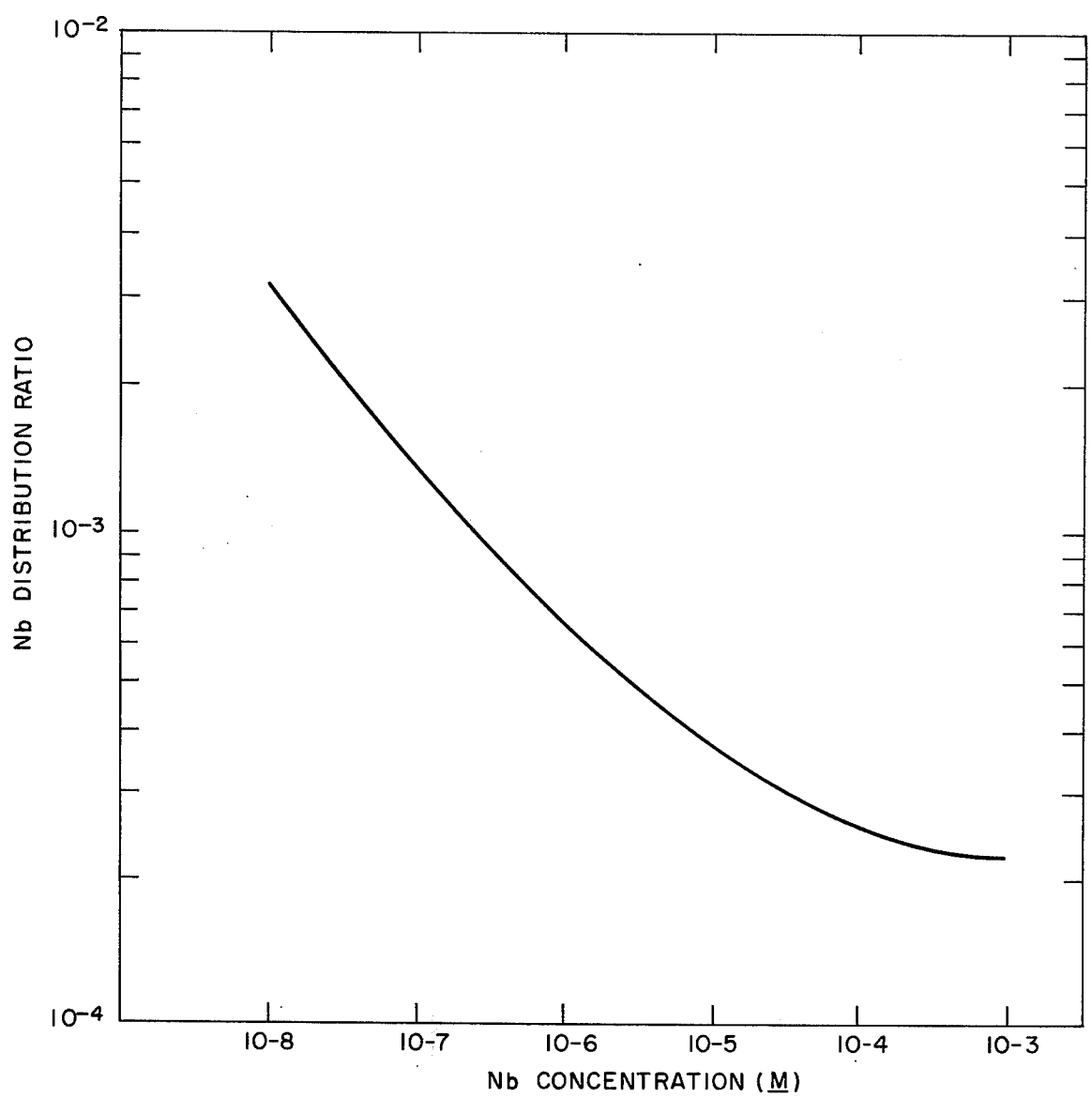
FIG. 2 is a graph of niobium distribution ratio between the organic and the aqueous phases versus niobium concentration in moles per liter showing the effect of various additions of one of the additives disclosed herein.

The variation of the niobium distribution ratio between the organic tributyl phosphate phase and the aqueous nitric acid phase with the change in niobium concentration is shown in FIG. 2. The addition of stable niobium shows a pronounced effect in reducing the extractability of radioactive niobium and the rate of decrease of the extractability decreases as the niobium concentration is increased beyond $10^{-5}$ M. The apparent success of this technique is believed to be due to the promotion of isotopic exchange due to the presence of metallic complex of niobium oxalate, that is, the metallic complex is sufficiently stable to disperse throughout the solutions in these examples (and thus through the aqueous dissolved nuclear fuel solutions in the process of this invention). In this state isotopic exchange occurs with fission product niobium such that when the metallic complex decomposes, all the niobium in solution reverts to a much less extractable form. Thus it is theorized that substantially all the niobium is combined in some non-ionic form that is very incapable of being extracted.

Hydrogen peroxide was used to determine whether its use could prevent precipitation on acidifying a solution of a niobium additive to at least 0.5 molar in nitric acid, as an acid concentration of at least this strength is desired to prevent any possible plutonium polymerization on addition of a niobium solution to dissolver solution of nuclear fuel. A 0.1 molar solution of potassium hexaniobate was made by dissolution in water. The solution was adjusted to 0.2 molar hydrogen peroxide and finally made 0.5 molar in nitric acid. On standing overnight, some precipitation of the niobium was observed. This was eliminated by reducing the niobium and hydrogen peroxide concentration to 0.01 M and 0.02 M respectively. An experiment (Example 2) was performed repeating the procedure of Example 1, and the niobium was added in the peroxide complex such that the final concentrations in the two solutions were $10^{-6}$ and $10^{-4}$. At the final uranium solvent saturation of 76% of theoretical, the extraction values observed are reflected by the line plotted in FIG. 2. The results of Example 2 were consistent with the data obtained from Example 1 and tended to indicate that hydrogen peroxide complex of niobium existed long enough to promote isotopic exchange and further that if the complex could be destroyed at reflux temperatures, and that it was effective in reducing the extractability.

EXAMPLES 3–30

A series of twenty eight examples were performed to measure the effect of parameters pertinent to the process on the possible use of stable niobium for achieving a lower Np-95 extractability from an aqueous dissolved nuclear fuel solution and to give a solution that can be more effectively scrubbed with a mineral acid. The feed solution was prepared as described in Examples 1 and 2, and the behavior of the Nb-95 was measured at the extraction stage and at various scrub stages of the four-stage scrub sequence to simulate an extraction column where the organic phase is tributyl phosphate with a dodecane diluent in contact with a uranium containing nitric acid solution.

Each run consisted of four examples with a total of seven runs, and the four examples in each run were done simultaneously. At least one of the four examples in each run was established as a control and the others were used to test the effect of various other parameters. Where stable niobium was used, as an additive, it was prepared as described in the Examples 1 and 2 and introduced as a peroxide complex in 0.5 M nitric acid with a ratio of hydrogen peroxide to niobium of 2.5. In examples where the nitrite ion was used to simulate the effect of that generated by radiolytic decomposition, it was added as a 0.1 M solution of $NaNO_2$ in 0.1 M nitric acid. Because of the formation of $HNO_2$ and the instability of $HNO_2$ in nitric acid systems, more of the nitrite solution was added after each half hour at reflux temperature. In three examples air sparging was used which consisted of bubbling air through the solution to mix the components and for these examples, more of the nitrite solution was added after each half hour at 50° C. Zirconium was added as zirconyl nitrate directly to the uranium-nitric acid solution and refluxed for 15 minutes before addition of the fission products spike prepared according to Examples 1 and 2.

The experiments were conducted by utilizing similar equipment to that used in Examples 1 and 2.

All extractions with tributyl phosphate and scrubbings with nitric acid were made with the solutions at 50° C. In some examples a temperature treatment was used, and this consisted of holding the aqueous dissolved nuclear fuel solution at 50° C for about either one-half or one hour after the stable niobium complex addition was made and prior to any extraction with tributyl phosphate. In some other examples the stable niobium complex addition was made when the aqueous dissolved nuclear fuel solution was at reflux temperature and then the solution was cooled to 50° C and held at that temperature for about one hour. In still other examples the zirconyl nitrate was added to the aqueous dissolved nuclear fuel solution at reflux temperature and the solution was cooled to 50° C followed by addition of the stable niobium complex.

The extraction and acid scrub were conducted to maintain a uranium concentration within the range of 66–80% of theoretical maximum concentration in the organic phase upon completion of the extraction and acid scrub. The nitric acid in the acid scrub contained about 0.2 M uranium to minimize uranium losses in the scrub sequence.

The concentration of the nitric acid in the acid scrub was varied as follows: Examples 3–14 had a concentration of 3 M for all four scrub stages, and Examples 15–30 had a concentration of 3 M for the first two stages and 2 M for the last two stages. For all scrub stages, an organic-to-aqueous volume ratio of 4 was used. For the extraction stage, an organic-to-aqueous volume ratio of 3 was used.

Table 1 presents the conditions for the different examples organized for the (1) preliminary treatment prior to the niobium peroxide addition in which there are columns specifying the zirconyl nitrate concentration in moles/liter sodium nitrite concentration in moles/liter and time at temperature and (2) the niobium complex addition step in which there are columns specifying the niobium concentration in moles/liter, sodium nitrite concentration in moles/liter, the temperature of the aqueous dissolved nuclear fuel solution during the niobium and sodium nitrite additions, the time the solution was maintained at that temperature after the niobium and sodium nitrite additions and whether air sparging was used. A blank indicates that no addition was made and that the corresponding time and temperatures are not pertinent due to the absence of any additives.

EXPERIMENTAL CONDITIONS

| Ex. No. | Preliminary Treatment Prior to Niobium Complex Addition | | | Niobium Complex Addition Step | | | | |
|---|---|---|---|---|---|---|---|---|
| | $ZrO(NO_3)$ (M/L) | $NaNO_2$ (M/L) | Time at Temp. (Hrs.) | Nb (M/L) | $NaNO_2$ (M/L) | Temp. (°C) | Time at Temp. (Hrs.) | Air Sparging |
| 3** | | | | | | | | No |
| 4 | | | | | | Reflux | 1.0 | No |
| 5* | | | | | | Reflux | 1.0 | No |
| 6 | | | | $1 \times 10^{-4}$ | | Reflux | 1.0 | No |
| 7** | | | | | | | | No |
| 8 | | | | $1 \times 10^{-4}$ | | Reflux | 2.0 | No |
| 9 | | | | $1 \times 10^{-5}$ | | Reflux | 1.0 | No |
| 10 | | | | $1 \times 10^{-6}$ | | Reflux | 1.0 | No |
| 11** | | | | | | | | No |
| 12 | | | | $1 \times 10^{-4}$ | | 50° | 1.0 | No |
| 13 | | | | $1 \times 10^{-5}$ | | 50° | 1.0 | No |
| 14 | | | | $1 \times 10^{-6}$ | | 50° | 1.0 | No |
| 15** | | | | | | | | No |
| 16 | | | | $1 \times 10^{-4}$ | | Reflux | 1.0 | No |

EXPERIMENTAL CONDITIONS-continued

| Ex. No. | Preliminary Treatment Prior to Niobium Complex Addition | | | Niobium Complex Addition Step | | | | |
|---|---|---|---|---|---|---|---|---|
| | $ZrO(NO_3)$ (M/L) | $NaNO_2$ (M/L) | Time at Temp. (Hrs.) | Nb (M/L) | $NaNO_2$ (M/L) | Temp. (°C) | Time at Temp. (Hrs.) | Air Sparging |
| 17 | | | | $1 \times 10^{-4}$ | | 50° | 1.0 | No |
| 18 | | | | $1 \times 10^{-4}$ | $1 \times 10^{-3}$ | 50° | 1.0 | No |
| 19** | | | | | | | | No |
| 20** | | | | | | Reflux | 1.0 | No |
| 21 | | | | $1 \times 10^{-4}$ | $1 \times 10^{-3}$ | 50° | 1.0 | No |
| 22** | $3 \times 10^{-3}$ | | 1.0 | | | | | No |
| 23** | $1 \times 10^{-3}$ | $1 \times 10^{-3}$ | 1.0 | | $1 \times 10^{-3}$ | 50° | 0.5 | No |
| 24** | $1 \times 10^{-2}$ | $1 \times 10^{-3}$ | 1.0 | | $1 \times 10^{-3}$ | 50° | 0.5 | No |
| 25 | $1 \times 10^{-3}$ | $1 \times 10^{-3}$ | 1.0 | $1 \times 10^{-4}$ | $1 \times 10^{-3}$ | 50° | 0.5 | No |
| 26 | $1 \times 10^{-2}$ | $1 \times 10^{-3}$ | 1.0 | $1 \times 10^{-4}$ | $1 \times 10^{-3}$ | 50° | 0.5 | No |
| 27** | $3 \times 10^{-3}$ | $1 \times 10^{-3}$ | 2.0 | | $1 \times 10^{-3}$ | 50° | 1.0 | No |
| 28 | $3 \times 10^{-3}$ | $1 \times 10^{-3}$ | 2.0 | | $1 \times 10^{-3}$ | 50° | 1.0 | Yes, Slow |
| 29 | $3 \times 10^{-3}$ | $1 \times 10^{-3}$ | 2.0 | $1 \times 10^{-4}$ | $1 \times 10^{-3}$ | 50° | 1.0 | Yes, Slow |
| 30 | $3 \times 10^{-3}$ | $1 \times 10^{-3}$ | 2.0 | $1 \times 10^{-4}$ | $1 \times 10^{-3}$ | 50° | 1.0 | Yes, Rapid&Slow |

Figure 3:
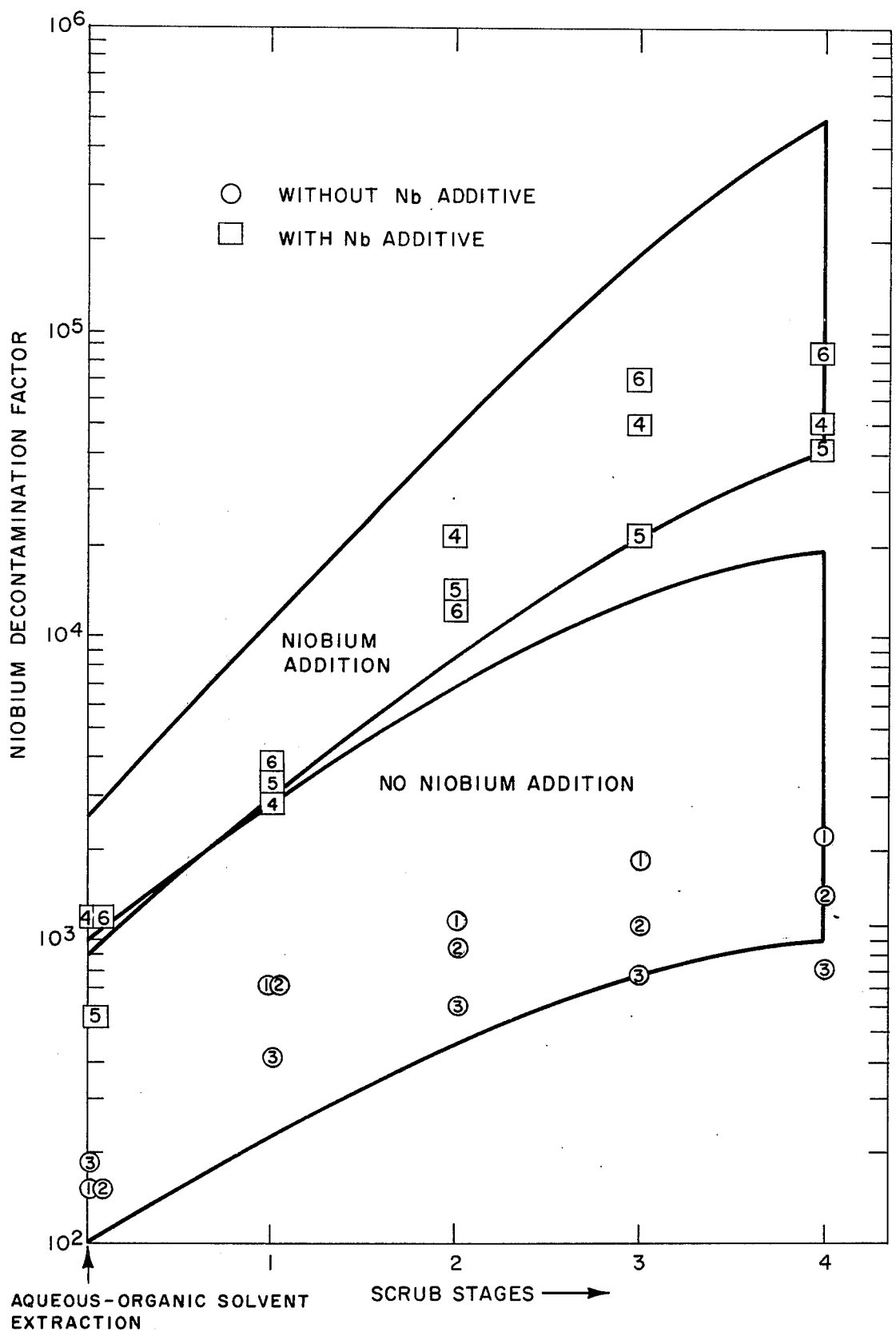
FIG. 3 is a graph of the zones of the cumulative decontamination factor during an initial aqueous-organic extraction followed by four subsequent aqueous scrub stages for reprocessing of simulated nuclear fuel for Examples 3–30 along with the plots of specific readings for reprocessing of irradiated nuclear fuel for Examples 31–36.

*No niobium addition only hydrogen peroxide at $2.5 \times 10^{-4}$ M/Liter
**Control The results consist of a niobium decontamination factor for the aqueous-organic solvent extraction and for each acid scrub stage (stages 1–4). The examples without niobium addition (3–5, 7, 11, 15, 19, 20, 22–24, 27 and 28) are encompassed in one region labelled "No Niobium Addition" and the remaining examples are encompassed in another region labelled "Niobium Addition" as shown in FIG. 3. An improvement of about a factor of 10 is apparent for the examples with a niobium addition. The improvement occurs at both the extraction stage and in each of the scrub stages. As used in these examples and this invention, the niobium decontamination factor is the ratio of the niobium concentration in ion or elemental concentration for a solution before a chemical treatment to the niobium concentration in ion or elemental concentration after a chemical treatment.

EXAMPLES 31–36 to verify the results of the bench scale studies (previously described in Examples 1–30) six further experiments (examples) were performed in high level radiation cells using full level irradiated nuclear reactor fuel. Three experiments involved the use of an aqueous dissolved nuclear fuel solution without a niobium additive (31–33) and the other three experiments (34–36) were a repetition of the first three experiments with a niobium additive. In each example an aqueous dissolved with a niobium additive. In each example an aqueous dissolved nuclear fuel solution of equal volume was used. The organic solvent (tributyl phosphate) used with each increment had different pretreatments. In one set of examples with and without a niobium additive fresh organic solvent (no previous usage and exposure history) was used. With the two other sets of examples with and without a niobium additive, solvent previously used with nuclear fuel (similar to a solvent recycle stream) was used. This was designed to simulate an organic solvent which had previously been repeatedly exposed to a high level radioactive fuel solution.

The irradiated nuclear fuel used was from two sources. The bulk of the $UO_2$ was from an EOC-6 fuel rod F6-2 from bundle DU-92 which had been irradiated in Dresden-1 from May 28, 1965 to Sep. 5, 1969 to an exposure of 15 GWd/T and had an appreciable cooling time. To provide Nb-95 activity, a smaller portion of $UO_2$ fuel irradiated in GETR for 1 cycle to an exposure of about 700 MWd/T was also used and had a cooling time of 4-½ months. These fuel materials were dissolved in $HNO_3$ at elevated temperatures (70°–90° C) to yield an aqueous dissolved nuclear fuel solution of 1.5 M uranium in 3 M $HNO_3$.

The in-cell experiments were conducted by utilizing equipment similar to that used in Examples 1 and 2, except that it was operate remotely. The sequence of steps employed in the solvent extraction cycle was similar to that described in the previous examples (3–30). Solvent-aqueous contacting times of one minute were used in all cases with the temperature maintained within the range of 40°–50° C. After the phases separated, the aqueous phase was drained into a bottle for sampling and the organic phase was drained into the next separatory funnel. A series of 4 scrubs of 3 M nitric acid was used.

For the three examples which involved niobium solution addition (34–36) the niobium solution was added to the nuclear fuel dissolver solution maintained at 60°C. The niobium peroxide additive in an acid solution had been prepared by the method described in Examples 3–30. This niobium peroxide containing solution was then added to the aqueous dissolved nuclear fuel solution such that the resultant concentration was $1 \times 10^{-4}$ M in niobium. The solution was mixed by air sparging for 10 minutes and then the solution remained standing for an additional 50 minutes before the first solvent extraction sequence was performed. All other operations were identical to the examples that did not have a niobium addition (31–33).

The results of the six examples are illustrated by the data points 1–6 (to correspond to Examples 31–36 respectively) in FIG. 3 with a surrounding ○ to indicate no niobium additive and with a surrounding ☐ to indicate a niobium additive. In these examples, Examples 31 and 34 had fresh organic solvent while Examples 32, 33, 35 and 36 had organic solvents previously used with the simulated nuclear fuel reprocessing thus simulating a solvent recycle stream. These results, which in essence represent experiments in triplicate verified the findings of the bench scale studies of Examples 3–30 in that the points are fairly well bounded by the bands derived from Examples 3–30. Thus, an enhancement of the niobium decontamination factor by at least tenfold is confirmed for the reprocessing of an irradiated nuclear fuel.

Examples of this invention have been described in considerable detail by way of illustration. It should be understood that various other modifications and adaptations thereof may be made by those skilled in that particular art without departing from the spirit and scope of this invention as defined in the following claims.

What is claimed is:

1. In a process for treating irradiated nuclear fuel to recover uranium and at least one transuranic isotope selected from the group consisting of neptunium and plutonium so that said uranium and said at least one transuranic isotope are substantially free of fission products which comprises dissolving said fuel in a strong mineral acid and forming an aqueous dissolved nuclear fuel solution and subsequentially treating said dissolved solution to separate said uranium and said at least one transuranic isotope therefrom substantially free of said fission products, the improvement comprising adding to said solution prior to treatment for separation of said uranium and said transuranic isotope a sufficient amount of an additive of a non-radioactive [stable] metallic complex in which the metallic component is selected from the group consisting of niobium, tantalum and combinations thereof and said amount is sufficient to alter the decontamination factor exhibited by radioactive niobium in said solution.

2. The process of claim 1 in which the additive is a niobium complex in a mineral acid.

3. The process of claim 2 in which the acid is nitric acid.

4. The process of claim 2 in which the additive is a niobium proxide complex.

5. The process of claim 2 in which the additive is a niobium oxalate complex.

6. The process of claim 2 in which the additive is a niobium tartrate complex.

7. The process of claim 1 in which the additive is a tantalum proxide complex.

8. The process of claim 1 in which the additive is a tantalum oxalate complex.

9. The process of claim 1 in which the additive is a tantalum tartrate complex.

10. The process of claim 1 in which the additive is present in an amount of about $10^{-6}$ to about $10^{-3}$ moles per liter of said solution.

11. The process of claim 1 in which an oxidant is added to said solution with said stable metallic complex.

12. The process of claim 1 in which the oxidant is selected from the group consisting of potassium bromate and potassium permanganate.

13. A process for treating irradiated nuclear fuel contained in clad rods to recover separately uranium, neptunium, and plutonium therefrom substantially free of fission products, said process comprising the steps of a. perforating the clad of the rods,
b. contacting the perforated rods with a strong mineral acid to dissolve the nuclear fuel and form an acid dissolver solution,
c. adding to said dissolver solution an additive of a nonradioactive metallic complex in an amount sufficient to alter the decontamination factor of radioactive niobium in said dissolver solution, said complex having the metallic component selected from the group consisting of niobium, tantalum and combinations thereof,
d. contacting said dissolver solution with an organic solvent to separate uranium, plutonium and neptunium into the organic solvent from said dissolver solution and leave an aqueous solvent extraction raffinate containing fission products,
e. contacting the organic solvent with a dilute mineral acid to strip the uranium, plutonium and neptunium from the organic solvent and from an aqueous extraction product,
f. adjusting the valence of plutonium and neptunium by contacting said aqueous solvent extraction product with a reductant,
g. concentrating said aqueous extraction product,
h. cooling said concentrated aqueous solvent extraction product,
i. contacting said concentrated aqueous solvent extraction product with an anion exchange resin so that plutonium in the +4 valence is extracted by the resin, leaving a first aqueous anion exchange raffinate containing neptunium and uranium,
j. adjusting the valence of the neptunium in said first aqueous anion exchange raffinate with a reductant,
k. contacting said first aqueous anion exchange raffinate with an anion exchange resin to extract the neptunium therefrom, and giving a second aqueous anion exchange raffinate,
l. dehydrating said second aqueous anion exchange raffinate to an anhydrous solid of uranium oxide, and
m. fluorinating the anhydrous solid to give uranium hexafluoride.

14. The process of claim 13 in which the additive is a niobium complex in a mineral acid.

15. The process of claim 14 in which the acid is nitric acid.

16. The process of claim 14 in which the additive is a niobium peroxide complex.

17. The process of claim 14 in which the additive is a niobium oxalate complex.

18. The process of claim 14 in which the additive is a niobium tartarate complex.

19. The process of claim 1 in which the additive is a tantalum peroxide complex.

20. The process of claim 13 in which the additive is a tantalum oxalate complex.

21. The process of claim 13 in which the additive is a tantalum tartrate complex.

22. The process of claim 13 in which the additive is present in an amount of about $10^{-6}$ to about $10^{-3}$ moles per liter of said solution.

23. The process of claim 13 in which an oxidant is added to said solution with said stable metallic complex.

24. The process of claim 13 in which the oxidant is selected from the group consisting of potassium bromate and potassium permanganate.

* * * * *